United States Patent [19]

LaBash et al.

[11] 3,966,574

[45] June 29, 1976

[54] ULTRAVIOLET POLYMERIZATION COATINGS SUITABLE FOR FOOD PACKAGING USING FDA APPROVED DYES AS PHOTOSENSITIZERS

[75] Inventors: John David LaBash, Berea; Vincent D. McGinniss, Valley City, both of Ohio

[73] Assignee: SCM Corporation, New York, N.Y.

[22] Filed: June 30, 1975

[21] Appl. No.: 591,644

Related U.S. Application Data

[63] Continuation-in-part of Ser. No. 431,282, Jan. 7, 1974, abandoned.

[52] U.S. Cl. .................... 204/159.24; 96/115 P; 204/159.18; 204/159.23; 260/42.21; 260/42.53; 260/80.75; 260/836; 260/837 R; 427/54; 428/418; 428/463; 526/89; 526/204; 526/217; 526/219; 526/225; 526/320; 526/328
[51] Int. Cl.² .................... C08F 2/46; C08F 4/00
[58] Field of Search .............. 96/115 P; 204/159.23, 204/159.24, 159.18; 260/42.21

[56] References Cited
UNITED STATES PATENTS

| | | | |
|---|---|---|---|
| 2,875,047 | 2/1959 | Oster | 96/115 P |
| 3,418,118 | 12/1968 | Thommes et al. | 96/115 P |
| 3,615,452 | 10/1971 | Cerwonka | 96/115 P |
| 3,759,807 | 9/1973 | Osborn et al. | 204/159.23 |

*Primary Examiner*—Richard B. Turer
*Attorney, Agent, or Firm*—Richard H. Thomas

[57] ABSTRACT

The present invention resides in the discovery that ethylenically unsaturated organic compounds can be readily photopolymerized by adding to such compounds a catalytic formulation including certain FDA approved food color additives and an amount of an organic amine activator. Particularly improved results are obtained by employing as said food color additive the combination of FD&C red No. 3 dye, with either FD&C red No. 2 dye, FD&C red No. 40 dye, or with both FD&C red No. 2 and FD&C red No. 40 dyes.

16 Claims, No Drawings

ULTRAVIOLET POLYMERIZATION COATINGS SUITABLE FOR FOOD PACKAGING USING FDA APPROVED DYES AS PHOTOSENSITIZERS

This application is a continuation-in-part application of prior application Ser. No. 431,282, filed Jan. 7, 1974 and now abandoned, and assigned to assignees of the present application.

The present invention relates to the polymerization curing of ethylenically unsaturated vehicles for surface coating, and particularly to the production of coatings suitable for food associated applications. In particular, the invention relates to the discovery that certain FDA (Food and Drug Administration) approved food color additives are capable, in combination and in the presence of an organic amine activator, of catalyzing the polymerization curing of ethylenically unsaturated vehicles when the latter are exposed to ultraviolet radiation. A particularly preferred additive formulation includes the combination of FD&C red No. 3 dye with FD&C red No. 40 and FD&C red No. 2 dyes. Use of FDA approved additives for coatings facilitates obtaining FDA approval of the coatings for food associated applications.

BACKGROUND OF THE INVENTION

It is known that photopolymerization of ethylenically unsaturated monomers can be initiated by exposure of the monomers to various sources of radiation. For example, methyl acrylate on long standing in sunlight transforms into a transparent, hardened mass. However, use of sunlight or sources of comparable energy to photopolymerize monomers or combinations of monomers, oligomers, etc., is not practical because of the very slow rate of polymerization.

Photopolymerization with a beam of wave energy such as ultraviolet light is also well known. Typically in carrying out such photopolymerization, a vinyl monomer is formulated with a light-sensitive photopolymerization catalyst (also referred to as a photoinitiator or photosensitizer). When the mixture is subjected to ultraviolet light, free radicals are produced which aid in effecting the polymerization.

Traditionally, developments in the photopolymerization art have been in the area of improving coating techniques or obtaining improved coatings, examples being reduction in reaction time, or achieving higher molecular weight polymers. Little attention has been paid to formulating coatings suitable for specialized applications such as food associated applications; i.e., the inside of can bodies. Such formulations have to meet stringent FDA requirements; and the additives heretofore employed, such as catalysts, have been selected on the basis of coating efficacy rather than on the basis of meeting such requirements.

Certain organic dyes are known to act as photosensitizers, some of which are food dyes approved by the FDA. One such dye, rose bengale (phthalein), designated by the Food and Drug Administration as FD&C red No. 3, is described in a number of patents, for instance, U.S. Pat. No. 3,615,452, by Edward J. Cerwonka. In the process of this patent, the dye is used in combination with a toluene diazonium compound; and no mention is made in the patent of suitability of the coating formulation for food associated uses. An earlier Oster U.S. Pat. No. 2,875,047 also makes reference to this dye but in combination with a reducing agent such as stannous chloride or ascorbic acid. Again no mention is made of suitability for food associated applications.

Another U.S. Pat. No. 3,418,118 to Glenn Anthony Thommes et al. also contains a reference to rose bengale as a suitable photoreducible dye. In this patent, the dye is described as part of a two-component initiating system of which the other component is described as a radical-producing agent, one such agent being triethanolamine. As with the above patents, the efficacy of the photoinitiator system for food associated applications is not indicated.

A patent to Osborn et al., U.S. Pat. No. 3,759,807, describes a two component photoinitiator which comprises an aryl ketone photosensitizer and an organic amine activator such as a tertiary alkanolamine. This patent is of interest in its listing of a large number of organic amines useful as activators. The disclosure of the Osborne et al. patent is incorporated by reference herein.

SUMMARY OF THE INVENTION

In accordance with the concepts of the present invention, there is provided a formulation particularly suitable for food associated uses and capable of photopolymerization by a source of ultraviolet radiation comprising a photopolymerizable ethylenically unsaturated compound, about 0.5–5% of a dye formulation consisting essentially of FD&C red No. 3 (phthalein) in combination with FD&C red No. 2, FD&C red No. 40, or both FD&C red No. 2 and red No. 40, an an amount of an organic amine activator. Particularly improved results are obtained by employing in combination FD&C red No. 3 and FD&C red No. 40, with or without FD&C red No. 2. Preferably the dyes are used in equal proportions. Best results are obtained with about 2% of a dye formulation comprising equal parts of FD&C red No. 2, FD&C red No. 3 and FD&C red No. 40, in combination with about 2–10% of an alkanolamine.

The organic amine activator can be any organic amine, a number of which are disclosed in the above-mentioned U.S. Pat. No. 3,759,807, incorporated by reference herein. Preferably, the amine is a secondary or tertiary amine. For instance, suitable results have been obtained with secondary and tertiary aliphatic amines such as diallyl amine and triethylamine. Aromatic amines such as N,N-dimethylaniline were found to be useful. However, the best results were obtained with an alkanolamine such as triethanolamine, methylethanolamine, trisopropanolamine, and others. Preferably, about 2–10% of the amine activator is employed.

The formulae for the preferred dyes of the present invention are as follows:

FD&C red No.2

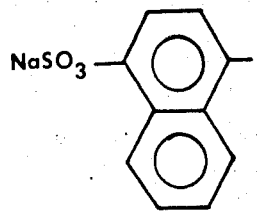
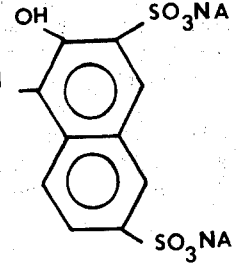

Trisodium salt of 1-(4-sulfo-1-naphthylazo)-2-naphthol-3,6-disulfonic acid,

FD&C red #3

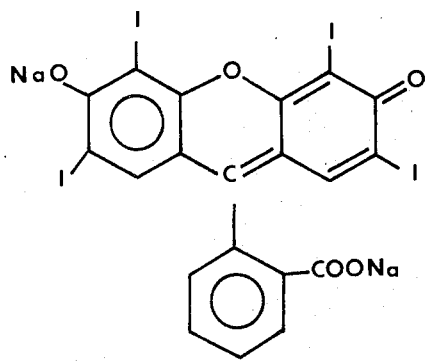

9-(o-carboxyphenyl)-6-hydroxy-2,4,5,7,tetraiodo-3H-xanthene-3-one, disodium salt.

FD&C red #40

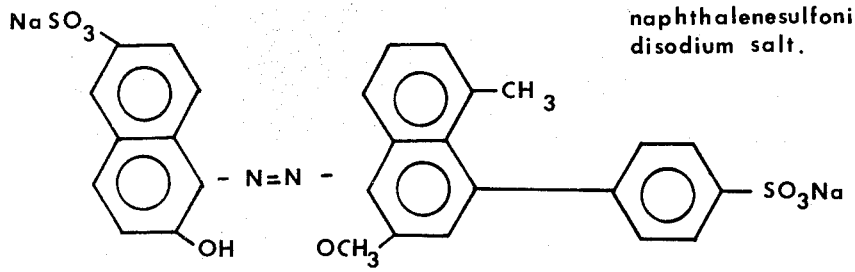

6-hydroxy-5-[(2-methoxy-5-methyl-4-sulfophenyl) azo]-2-naphthalenesulfonic acid disodium salt.

The starting vinyl compound may comprise any of the know photopolymerizable organic vinyl compounds. Suitable ethylenically unsaturated compounds which are photopolymerizable with the aid of the above photoinitiators include the various vehicles or binders which can be reactive vinyl monomers such as the lower alkyl esters of acrylic and methacrylic acids or polymers and prepolymers. Vinyl monomers particularly adapted for photopolymerization include methylmethacrylate, ethylmethacrylate, 2-ethylhexyl methacrylate, butylacrylate, isobutyl methacrylate, the corresponding hydroxy acrylates; eg., hydroxy ethylacrylate, hydroxy propyl acrylate, hydroxy ethylhexyl acrylate, also the glycol acrylates; eg., ethylene glycol dimethacrylate, hexamethylene glycol dimethacrylate, the allyl acrylates; eg., allyl methacrylate, diallyl methacrylate, the epoxy acrylates; eg., glycidyl methacrylate; and the aminoplast acrylates; eg., melamine acrylate. Others such as vinyl acetate, vinyl and vinylidene halides and amides, eg., methacrylamide, acrylamide, diacetone acrylamide, butadiene, styrene, vinyl toluene, and so forth are also included. A preferred formulation includes ⅓ 2-ethylhexyl acrylate, ⅓ trimethylol-propane triacrylate and ⅓ diacrylate of the diglycidyl ether of bis-phenol A.

Sources for ultraviolet radiation include a number of commercial units such as electric arc lamps, plasma arc torches and even lasers. One such source is a plasma arc radiation source (hereinafter referred to as PARS) described in U.S. Pat. No. 3,364,387. This apparatus has a source intensity of at least 350 watts per square centimeter steradian (about 1,000 kilowatts per square foot of source projected area) having only a minor part of the energy in peaks of bandwidths less than 100 angstrom units with less than about 30% of the light radiated having wave lengths shorter than 4,000 angstrom units and at least about 70% of the light energy radiated having wave lengths longer than 4,000 angstrom units. The source intensity can be as high as 5,000 watts (about 15 kilowatts per square foot of source projected area) or more per square centimeter steradian.

Another ultraviolet light source (hereinafter referred to as a conventional source) is supplied by Ashdee Corporation. This source has two 4,000-watt mercury vapor lamps in parallel array designed for emitting near U.V. energy. The lamps are Hanovia model No. 652-OA 431 U.V. lamps about 20 inches in length. Each is equipped with an efficient collector.

Copending application of de Souza and Buhovecky, Ser. No. 189,254, describes a radiation unit employing a laser having a lasing output in the ultraviolet spectrum range. The subject matters of the aforementioned patent and patent application are incorporated herein by reference.

A principal advantage of the invention is that the food dyes employed herein are FDA approved so that FDA approval of the coating formulations of the invention can therefore more readily be obtained for application to the inside of can bodies and for other food associated applications.

In addition, the speed of ultraviolet curing using the sensitizers of the present invention is quite good; and the depth of curing is quite practical so that the resultant polymerized deposit resists scratching or disruption when first ostensibly "dry" on the surface to which it is applied. Typical film thicknesses for the coating are about 0.1 to as high as 10 mils. Typical substrates are metal, mineral, wood, paper, plastic, fabric and ceramic.

Useful pigments can be incorporated in the coating formulations in moderate proportions without deleterious effects. Opacifying pigments such as zinc oxide can be used with ease. Titania, anatase, or rutile makes for a more difficult film to cure by ultraviolet radiation; but such opacifying pigmentation can be used. Other filler materials and coloring pigments such as basic lead sulfate, magnesium silicate, silica, clays, wollastonite, talc, mica, chromates, iron pigments, wood flour and even reinforcing glass fiber or flakes are also suitable in the formulation to make a coating. Ordinarily it is desirable to use pigments which do not absorb a great deal of ultraviolet radiation in the same region of the ultraviolet spectrum as absorbed by the sensitizer. Pigmented or filled films for the purpose of the present invention preferably should be no more than a mil thick and generally about 0.1–0.5 mils in thickness for maximum efficiency and economy in curing.

Typically the coatings of the present invention can constitute the entire deposit or can simply be a binder for subsequent coatings or solids to yield a cured product in the nature of a paint, varnish, enamel, lacquer, stain or ink. Usually the vehicles of the invention are fluid at ordinary temperature operation (between about 30°F to about 300°F and advantageously between ordinary room temperature and about 180°F) and when polymerized by ultraviolet radiation give a tack-free film or deposit that is durable enough for ordinary handling. In the cured state, the coating is resinous and polymeric in nature, usually crosslinked.

The following examples show ways in which the invention has been practiced, but should not be construed as limiting it. Unless otherwise specifically stated herein, all parts are parts by weight, all percentages are weight percentages, and all temperatures are in degrees Fahrenheit. Where the binder is of the type normally cured by free-radical polymerization, it is sometimes advantageous for completeness of cure and speed to maintain a substantially inert atmosphere above the irradiated workpiece. Generally this is effected by maintaining a purge of nitrogen or other inert gas in the area of the workpiece or placing a thin film of completely transparent polyethylene over the workpiece.

In the following examples, either or both of two separate sources of ultraviolet light were used, one being a plasma arc radiation source (PARS) and the other the conventional ultraviolet light source supplied by Ashdee Corporation. Exposure times were from 0.08 to 7 secs. calculated from the speed of the conveyor belt on which the panels were placed. These times differ depending upon the type of source used. For instance, a belt speed rate of 250 ft. per minute corresponds to 0.08 secs. exposure time in a PARS unit, and to 2 secs. exposure time in a conventional (Ashdee) unit. The following Table I equates belt speed and exposure times:

TABLE I

| Belt Speed (Ft. per Min.) | Exposure time (secs.) Conventional Source | PARS Source |
|---|---|---|
| 86–100 | 7 | 0.2 |
| 150 | 5 | 0.16 |
| 200 | 3–5 | 0.1 |
| 250 | 2 | 0.08 |

In all tests, the panels were placed approximately three to five inches from the radiation source. Results of the runs are given in terms of wet, tacky or tack-free, meaning as follows:

"Wet" means no cure;
"Tacky" means some degree of curing; and
"Tack-free" means full cure, hard surface.

In all of the examples, the PARS unit was employed with an inert nitrogen atmosphere in the area of the workpiece. The Ashdee unit was employed using a clear sheet of polyethylene placed over the workpiece prior to exposure.

EXAMPLE 1

A clear polymerizable composition of ⅓ 2-ethylhexyl acrylate, ⅓ trimethylol-propane triacrylate and ⅓ diacrylate of the diglycidyl ether of bis-phenol A (DER 332 di-acrylate, trademark Dow Chemical Company) was test cured using plasma arc radiation (PARS). The coating composition included 2% of a solution of equal parts of FD&C red No. 2 and FD&C red No. 3 and 2% methyldiethanolamine. Curing was carried out by passing test aluminum panels having the coating composition thereon below a rectangular irradiating window of an enclosed horizontal conveyor unit at various line speeds from about 50 feet per minute to about 260 feet per minute giving periods of radiation from about 0.4 sec. to about 0.1 sec., respectively. The compositions were applied to the aluminum panels in films of about 0.4 mil thickness. The atmosphere around the workpiece during irradiation was kept essentially inert by purging with nitrogen. Irradiation energy supplied by the PARS unit at the workpiece surface was about 35 kilowatts per square foot with slightly less than 6 kilowatts per square foot thereof being in the ultraviolet spectrum. In each instance, complete cure of the film was obtained, as evidenced by a lack of tackiness to the touch.

EXAMPLE 2

The following Table II gives comparative results using single dyes and combinations of dyes in accordance with the concepts of the present invention, with and without methyldiethanolamine. The superior results achieved using the dyes with at least 2% methyldiethanolamine are clearly shown.

The polymerizable composition of each test run consisted of ½ 2-ethylhexyl acrylate, ⅓ trimethylol-propane triacrylate and ⅓ diacrylate of the diglycidyl ether of bis-phenol A. Each sensitized coating composition was poured onto a steel panel and drawn down with a No. 8 wound wire rod to a film thickness or coating of approximately 0.5 mil. The coated but wet panels were then placed on a conveyor belt and exposed to sources of ultraviolet radiation. Two separate sources of ultraviolet radiation were used, one being a plasma arc radiation source (PARS) and the other a conventional ultraviolet light source supplied by Ashdee Corporation, described above, having two 4,000-watt mercury lamps. Exposure times were from 0.20 secs. for the PARS unit to 7.0 secs. for the Ashdee unit, calculated from the speed of the conveyor belt on which the panels were placed.

TABLE II

| Dye 2% | Methyldiethanolamine | Conventional Cure 7.0 Secs. | PARS Cure 0.2 Sec. |
|---|---|---|---|
| FD&C red No. 2 | None | Wet | Wet |
| FD&C red No. 2 | 2–10% | Tack-free | Tack-free |
| FD&C red No. 40 | None | Wet | Wet |

TABLE II-continued

| Dye 2% | Methyldieth- anolamine | Conventional Cure 7.0 Secs. | PARS Cure 0.2 Sec. |
|---|---|---|---|
| FD&C red No. 40 | 2–10% | Tack-free | Tack-free |
| FD&C blue No. 1 | None | Wet | Wet |
| FD&C blue No. 1 | 2–10% | Tack-free | Tack-free |
| FD&C red No. 3 | None | Wet | Wet |
| FD&C red No. 3 | 2–10% | Tack-free | Tack-free |
| Combinations of FD&C red No. 2, FD&C red No. 40, FD&C blue No. 1 and FD&C red No. 3 in equal proportions | None | Wet | Wet |

By comparison, the following FDA approved dyes resulted in no curing, with or without 2–10% metyldiethanolamine, producing in each instance a "wet" condition following exposure of 7.0 secs. and 0.2 sec., with the conventional and PARS units, respectively: green No. 3, yellow No. 6, FD&C yellow No. 5 red No. 100, blue No. 2, and any and all combinations of these.

This example illustrates the efficacy of certain FD&C dyes of the present invention and the effect of these dyes with 2–10% methyldiethanolamine. It should be pointed out that in each test, several runs were made employing varying amounts. Effective results were achieved in all instances where the amount of methyldiethanolamine was between about 2% and about 10% based on the weight of the total formulation.

The tests established the criticality of the FDA approved dyes red No. 2, red No. 40, blue No. 1 and red No. 3, and also the criticality of an organic amine activator such as 2–10% methyldiethanolamine. Any and all combinations of these dyes, without methyldiethanolamine, produced no curing.

EXAMPLE 3

This example illustrates the advantage of using combinations of the dyes of the present invention, with 2–10% methyldiethanolamine. Acrylic formulations were prepared according to Example 2. Methyldiethanolamine was employed in varying amounts between about 2% and about 10% based on the weight of the total formulation. Where several dyes are listed, equal parts, unless otherwise indicated, were used. The total amount of dye used in each run was about 2%, based on the weight of the total formulation. The results are given in the following Table III:

TABLE III

| Run | Combination of Dyes | Methyldieth- anolamine | CURE Conventional (Exposure Time-Secs.) | CURE PARS (Exposure Time-Secs.) |
|---|---|---|---|---|
| 1. | FD&C red No. 2 | 2–10% | Wet (2–5) | Wet (0.08–.16) |
| 2. | FD&C red No. 40 | 2–10% | Wet (2–5) | Wet (0.08–.16) |
| 3. | FD&C blue No. 1 | 2–10% | Wet (2–5) | Wet (0.08–.16) |
| 4. | FD&C red No. 3 | 2–10% | Wet (2–5) | Wet (0.08–.16) |
| 5. | FD&C red No. 2 red No. 40 blue No. 1 red No. 3 | 2–10% | Tack-free (2.0) | Tack-free (0.08) |
| 6. | FD&C red No. 2 red No. 40 red No. 3 | 2–10% | Tack-free (2.0) | Tack-free (0.08) |
| 7. | FD&C red No. 40 red No. 3 | 2–10% | Tack-free 5 seconds | Tack-free (0.10) |

The combinations particularly of FD&C red No. 3, with either red No. 40 or with both red No. 40 and red No. 2, and with methyldiethanolamine, resulted in significantly more rapid curing and in a tack-free surface after minimum exposure time. As evidenced by Table II, FD&C red No. 2, red No. 40, red No. 3, and blue No. 1 will produce individually a tack-free surface when employed with methyldiethanolamine, but at increased exposure times on the order of 7.0 and 0.2 sec., respectively, for the Ashdee and PARS units. It is apparent that the combinations of the dyes in accordance with the present invention reduced the exposure times by more than half.

EXAMPLE 4

A clear vehicle was prepared from ½ part pentaerithritol triacrylate and ½ part hydroxyethyl acrylate, and curing was carried out in the same manner as in Example 2 employing 0.5 mils thick coatings applied to a plurality of test panels. In the absence of any of the sensitizers of the present invention, no curing of the coated film was observed, even after repeated exposure to the ultraviolet sources.

Additional test panels were run with the dyes of the present invention, combinations thereof and methyldiethanolamine added to the vehicle. The panels coated with the sensitized vehicles were exposed to PARS and conventional radiation at 0.1 sec. exposure time for the PARS unit and 5 secs. exposure time for the conventional unit, with the following results:

TABLE IV

| Run | Dyes (2%) | Methyldieth- anolamine | Conventional Cure-5 secs. Exp. Time | PARS Cure 0.1 sec. Exp. Time |
|---|---|---|---|---|
| 1. | FD&C red No. 3 | 2-10% | Wet | Wet |
| 2. | FD&C red No. 2 | 2-10% | Wet | Wet |
| 3. | FD&C red No. 40 | 2-10% | Wet | Wet |
| 4. | FD&C red No. 2 and FD&C red No. 40 | 2-10% | Wet | Wet |
| 5. | FD&C red No. 2 and FD&C red No. 3 | 2-10% | Tacky | Tacky |
| 6. | FD&C red No. 40 and FD&C red No. 3 | 2-10% | Tacky | Tacky |
| 7 | FD&C red No. 3 red No. 2 red No. 40 | 2-10% | Tack-free | Tack-free |

A truly tack-free surface was obtained only with the combination of FD&C red No. 3, red No. 2 and red No. 40, with methyldiethanolamine, indicating the superiority of this combination. However, Table IV shows that useful results can be obtained with FD&C No. 3 in combination with either FD&C red No. 2 or FD&C red No. 40.

Formulae were given for the preferred dyes FD&C red No. 2, red No. 3 and red No. 40. It was also mentioned that FD&C blue No. 1 was a usable dye in accordance with the concepts of the present invention. The formula for this dye is as follows:

Disodium salt of a triphenyl-menthane dye

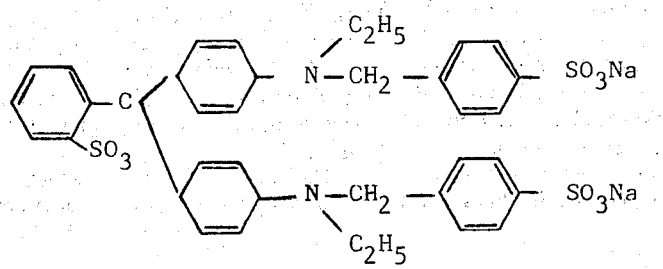

EXAMPLE 5

This example demonstrates applicability of the concepts of the present invention with amines other than methyldiethanolamine.

The polymerizable coating composition contained, on a weight basis, ⅓ trimethylolpropane triacrylate, ⅓ 2-hydroxyethyl acrylate and ⅓ diacrylate of the diglycidyl ether of bis-phenol A (DER 332, Trademark Dow Chemical Co.). The composition also contained about 2% of equal parts of red No. 40, red No. 2, and red No. 3 and 3-10% of an organic amine, except in a control test in which no amine was used. In each of the tests, except the control test, a 2 ml sample of the sensitized coating composition was mixed with the selected amine and was irradiated in a glass vial for four minutes under an 800 watt General Electric Co. lamp. The control test was the same except that no amine was added. The results of the tests were also checked by preparing similar samples and placing them as 0.5 ml thick films on glass slides and activating the films under the General Electric Co. lamp for 10 minutes.

The results are summarized in the following Table V.

TABLE V

| Amine | Result |
|---|---|
| None | No polymer formation |
| Triethylamine | 95% polymer formation |
| N,N-diethylaniline | 90% polymer formation |
| Diallylamine | 75% polymer formation |
| Methyldiethanolamine | 100% polymer formation |
| Methylethanolamine | 100% polymer formation |
| Dimethylethanolamine | 100% polymer formation |
| Triethanolamine | 100% polymer formation |
| Triisopropanolamine | 100% polymer formation |

Having thus described the invention, what is claimed is:

1. In a process for photopolymerizing a composition comprising a photopolymerizable ethylenically unsaturated vehicle and a photoinitiator system containing a photosensitizer and 2-10% by weight of an organic amine activator by exposure to ultraviolet radiation, the improvement, rendering said composition suitable for food associated applications, comprising incorporating into said composition as said photosensitizer 0.5-5% by weight based on the weight of the composition of a dye formulation consisting essentially of 9-(o-carboxy-phenyl)-6-hydroxy-2,4,5,7-tetraiodo-3H-xanthene-3-one, disodium salt (FD&C red No. 3) in combination with at least one azo dye selected from the group consisting of trisodium salt of 1-(4-sulfo-1-naphthylazo)-2-naphtol-3,6-disulfonic acid (FD&C red No. 2) and 6-hydroxy-5-[(2-methoxy-5-methyl-4-sulfophenyl)azo]-2-naphthalenesulfonic acid disodium salt (FD&C red No. 40).

2. The process of claim 1 wherein equal parts of said dyes are incorporated into said vehicle.

3. The process of claim 1 wherein said composition comprises about 2-10% by weight of said organic amine activator, said activator being an alkanolamine.

4. The process of claim 3 wherein said alkanolamine is methyldiethanolamine.

5. In a process for photopolymerizing a composition comprising a photopolymerizable ethylenically unsaturated vehicle and a photoinitiator system containing a photosensitizer and 2-10% by weight of an organic amine activator by exposure to ultraviolet radiation, the improvement rendering said composition suitable for food associated applications which comprises incorporating into said composition as said photosensitizer about 0.5–5% by weight based on the weight of the composition of a dye formulation consisting essentially of: trisodium salt of 1-(4-sulfo-1-naphthylazo)-2-naphthol-3,6-disulfonic acid (FD&C red No. 2); 9-(o-carboxyphenyl)-6-hydroxy-2,4,5,7-tetraiodo-3H-xanthene-3-one, disodium salt (FD&C red No. 3); and 6-hydroxy-5-[(2,methoxy-5-methyl-4-sulfophenyl)azo]-2-naphthalensulfonic acid disodium salt (FD&C red No. 40), in equal parts.

6. The process of claim 5 wherein said photopolymerizable vehicle comprises ⅓ part 2-ethylhexyl acrylate, ⅓ trimethylol-propane triacrylate and ⅓ diacrylate of the diglycidyl ether of bis-phenol A.

7. The process of claim 5 wherein said composition comprises about 2–10% by weight of said organic amine activator, said activator being an alkanolamine.

8. The process of claim 7 wherein said alkanolamine is methyldiethanolamine.

9. A photopolymerizable composition curable by exposure to ultraviolet radiation comprising a photopolymerizable ethylenically unsaturated vehicle and a photoinitiator system, the later containing a photosensitizer and 2–10% by weight of an organic amine activator, the improvement for rendering said composition suitable for food associated applications comprising incorporating into said composition as said photosensitizer 0.5–5% by weight, based on the weight of the composition, of a dye formulation consisting essentially of (9-(o-carboxy-phenyl)-6-hydroxy-2,4,5,7-tetraiodo-3H-xanthene-3-one, disodium salt (FD&C red No. 3) in combination with at least one azo dye selected from the group consisting of trisodium salt of 1-(4-sulfo-1-naphthylazo)-2-naphtol-3,6-disulfonic acid (FD&C red No. 2) and 6-hydroxy-5-[(2-methoxy-5-methyl-4-sulfophenyl)azo]-2-naphthalenesulfonic acid disodium salt (FD&C red No. 40).

10. The composition of claim 9 wherein equal parts of said dyes are incorporated into said vehicle.

11. The composition of claim 9 comprising about 2–10% by weight of said organic amine activator, said activator being an alkanolamine.

12. The composition of claim 11 wherein said alkanolamine is methyldiethanolamine.

13. A photopolymerizable composition curable by exposure to ultraviolet radiation comprising a photopolymerizable ethylenically unsaturated vehicle and a photoinitiator system, the latter containing a photosensitizer and an 2–10% by weight of organic amine activator, the improvement for rendering said composition suitable for food associated applications comprising incorporating into said composition as said photosensitizer 0.5–5% by weight, based on the weight of the composition, of a dye formulation consisting essentially of: trisodium salt of 1-(4-sulfo-1-naphthylazo)-2-naphthol-3,6-disulfonic acid (FD&C red No. 2); 9-(o-carboxyphenyl)-6-hydroxy-2,4,5,7-tetraiodo-3H-xanthene-3-one, disodium salt (FD&C red No. 3); and 6-hydroxy-5-[(2-methoxy-5-methyl-4-sulfophenyl)azo]-2-naphthalensulfonic acid disodium salt (FD&C red No. 40), in equal parts.

14. The composition of claim 13 wherein said photopolymerizable vehicle comprises ⅓ part 2-ethylhexyl acrylate, ⅓ trimethylol-propane triacrylate and ⅓ diacrylate of the diglycidyl ether of bis-phenol A.

15. The composition of claim 13 wherein said composition comprises about 2–10% by weight of said organic amine activator, said activator being an alkanolamine.

16. The composition of claim 15 wherein said alkanolamine is methyldiethanolamine.

* * * * *

UNITED STATES PATENT OFFICE
CERTIFICATE OF CORRECTION

PATENT NO. : 3,966,574
DATED : June 29, 1976
INVENTOR(S) : John David LaBash and Vincent D. McGinniss It is certified that error appears in the above-identified patent and that said Letters Patent are hereby corrected as shown below:

Column 2, line 38, after "red No. 40", change first "an" to
--and--; line 57, correct the spelling of
--triisopropanolamine--.
Column 3, line 34, change "know" to --known--.
Column 4, the first formula should read --9-(o-carboxyphenyl)-
6-hydroxy-2,4,5,7-tetraiodo-3H-xanthene-3-one, disodium
salt.--; line 66, after "mineral", insert --glass--.
Column 7, line 42, after "FD&C yellow No. 5", add a --,--.
Column 12, line 15, claim 13, before "2-10%", delete "an";
same line, before "organic amine", insert -- an --.

Signed and Sealed this

Twenty-eighth Day of September 1976

[SEAL]

Attest:

RUTH C. MASON
Attesting Officer

C. MARSHALL DANN
Commissioner of Patents and Trademarks